US010785035B1

(12) United States Patent
Lv (10) Patent No.: US 10,785,035 B1
(45) Date of Patent: Sep. 22, 2020

(54) ANTI-REPLAY ATTACK AUTHENTICATION PROTOCOL

(71) Applicant: Alibaba Group Holding Limited, George Town (KY)

(72) Inventor: Hong Lv, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/668,812

(22) Filed: Oct. 30, 2019

Related U.S. Application Data (63) Continuation of application No. PCT/CN2019/084510, filed on Apr. 26, 2019.

(51) Int. Cl.
| | | |
|---|---|---|
| H04L 29/06 | (2006.01) | |
| H04L 9/32 | (2006.01) | |
| G06F 16/23 | (2019.01) | |
| H04L 9/06 | (2006.01) | |
| G06F 16/2455 | (2019.01) | |

(52) U.S. Cl.
CPC ........ H04L 9/3239 (2013.01); G06F 16/2379 (2019.01); G06F 16/24552 (2019.01); H04L 9/0637 (2013.01); H04L 9/3247 (2013.01); H04L 2209/38 (2013.01)

(58) Field of Classification Search
CPC ... H04L 9/3239; H04L 9/0639; H04L 9/3247; H04L 2209/38; H04L 9/0637; G06F 16/2379; G06F 16/24552
See application file for complete search history.

(56) References Cited

U.S. PATENT DOCUMENTS

| 10,505,708 | B2* | 12/2019 | Xia .......................... H04L 9/00 |
| 2017/0228731 | A1 | 8/2017 | Sheng et al. |
| 2018/0082296 | A1* | 3/2018 | Brashers ............. H04L 63/0428 |
| 2018/0152297 | A1* | 5/2018 | Fielding ................ H04L 9/3297 |
| 2018/0248845 | A1* | 8/2018 | Irwan .................. H04L 63/0218 |
| 2019/0124146 | A1 | 4/2019 | Austin et al. |
| 2019/0165943 | A1* | 5/2019 | Chari .................... H04L 9/3221 |

(Continued)

FOREIGN PATENT DOCUMENTS

| CA | 3043536 | 11/2018 |
| CN | 108711052 | 10/2018 |

(Continued)

OTHER PUBLICATIONS

Greenspan, Gideon. "Scaling blockchains with off-chain data". https://www.multichain.com/blog/2018/06/scaling-blockchains-off-chain-data/. Jun. 13, 2018. (Year: 2018).*

(Continued)

Primary Examiner — Sarah Su
(74) Attorney, Agent, or Firm — Fish & Richardson P.C.

(57) ABSTRACT

Disclosed herein are methods, systems, and apparatus, including computer programs encoded on computer storage media, for enhancing blockchain network security. Embodiments of this specification include receiving a transaction request from a client, wherein the transaction request includes a transaction requested to be recorded on a blockchain and a transaction hash calculated based on hashing the transaction; determining the transaction hash is not previously stored in a cache resource or the blockchain; storing the transaction hash in the cache resource; and executing the transaction request.

21 Claims, 6 Drawing Sheets

(56) References Cited

U.S. PATENT DOCUMENTS

| | | | |
|---|---|---|---|
| 2019/0228386 A1* | 7/2019 | Onnainty | H04L 9/3239 |
| 2019/0245688 A1* | 8/2019 | Patin | H04L 9/0637 |
| 2019/0278920 A1* | 9/2019 | Black | G06F 21/602 |
| 2019/0279241 A1* | 9/2019 | DiTomaso | G06Q 30/0217 |
| 2019/0281009 A1* | 9/2019 | Abley | H04L 12/4633 |
| 2019/0306128 A1* | 10/2019 | Kothavale | H04L 9/3239 |
| 2019/0310980 A1* | 10/2019 | Zhang | H04L 9/0869 |
| 2019/0319798 A1* | 10/2019 | Chalkias | H04L 9/3247 |
| 2019/0370241 A1* | 12/2019 | Miraldo | G06F 16/1824 |
| 2020/0007315 A1* | 1/2020 | Vouk | H04L 63/20 |
| 2020/0052899 A1* | 2/2020 | Finlow-Bates | H04L 9/0863 |
| 2020/0119916 A1* | 4/2020 | Pickhardt | G06F 21/45 |
| 2020/0128044 A1* | 4/2020 | Xie | H04L 9/3239 |

FOREIGN PATENT DOCUMENTS

| | | | |
|---|---|---|---|
| CN | 109389502 | 2/2019 | |
| KR | 101835519 | 4/2018 | |
| WO | WO 2017011601 | 1/2017 | |
| WO | WO 2018032373 | 2/2018 | |
| WO | WO 2018205971 | 11/2018 | |
| WO | WO-2018229632 A1 * | 12/2018 | H04L 63/1441 |
| WO | WO 2019072276 | 4/2019 | |
| WO | WO-2019120328 A2 * | 6/2019 | G06F 21/53 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Zhihu.com [online], "Bloom filter," Sep. 2019, [Retrieved on Dec. 24, 2019], retrieved from: URL <https://zhuanlan.zhihu.com/p/31498003>, 7 pages (with Machine Translation).

European Extended Search Report in European Appln. No. 19739184.0, dated Apr. 20, 2020, 10 pages.

PCT International Search Report and Written Opinion in International Appln No. PCT/CN2019/084510, dated Jan. 31, 2020, 6 pages.

* cited by examiner

ANTI-REPLAY ATTACK AUTHENTICATION PROTOCOL

CROSS-REFERENCE TO RELATED APPLICATIONS

This application is a continuation of PCT Application No. PCT/CN2019/084510, filed on Apr. 26, 2019, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular use case. Example types of blockchain networks can include public blockchain networks, private blockchain networks, and consortium blockchain networks. A consortium blockchain network is provided for a select group of entities, which control the consensus process, and includes an access control layer.

In networking applications, data transmitted over a network connection between two computing devices may be susceptible to various network attacks such as replay attacks. A replay attack involves an attacker intercepting one or more messages sent between the two computing devices and re-sending the messages (perhaps with some modifications) at a later date to prompt execution of the same behavior prompted by the original messages. For example, an attacker may intercept a payment request and replace a destination account in the request with its own account. The attacker may then send the modified payment request to attempt to cause funds to be transferred to its own account.

In a centralized system involving multiple clients interacting with a central server, an anti-replay attack protocol can be implemented, for example, by including an identifier (e.g., a nonce) in each message that can only be used once. The central server can keep track of which nonces have been used, and reject the message that includes a nonce that has already been included in another message or an invalid nonce. An attacker then cannot simply replay a message with the same nonce, as the central server will reject the message. In decentralized applications lacking a central server, it may be challenging to maintain a list of nonces that have been used, as it may take time for different network devices to update the list of nonces once a message is received, leaving a window of time where a replay attack using a message with the same nonce could be accepted. Therefore, there is a need for methods for enhancing blockchain network security.

SUMMARY

Embodiments of this specification include computer-implemented methods for enhancing data security on a blockchain network. More particularly, embodiments of this specification are directed to implementing an anti-replay attack authentication protocol for clients connected to a blockchain network.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

DESCRIPTION OF DRAWINGS

Like reference symbols in the various drawings indicate like elements.

DETAILED DESCRIPTION

Embodiments of this specification include computer-implemented methods for enhancing data security on a blockchain network. More particularly, embodiments of this specification are directed to implementing an anti-replay security scheme for each client connected to a blockchain network. In some embodiments, actions include receiving a transaction request from a client; determining the transaction hash is not previously stored in a cache resource or the blockchain; storing the transaction hash in the cache resource; and executing the transaction request.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

Embodiments of this specification are described in further detail herein in view of the above context. More particularly, and as introduced above, embodiments of this specification are directed to implementing an anti-replay attack authentication protocol for clients connected to a blockchain network.

In some embodiments, the disclosed anti-replay attack authentication protocol tags each proposed transaction with a unique transaction hash to prevent an attacker from replaying stolen client information.

Figure 1:
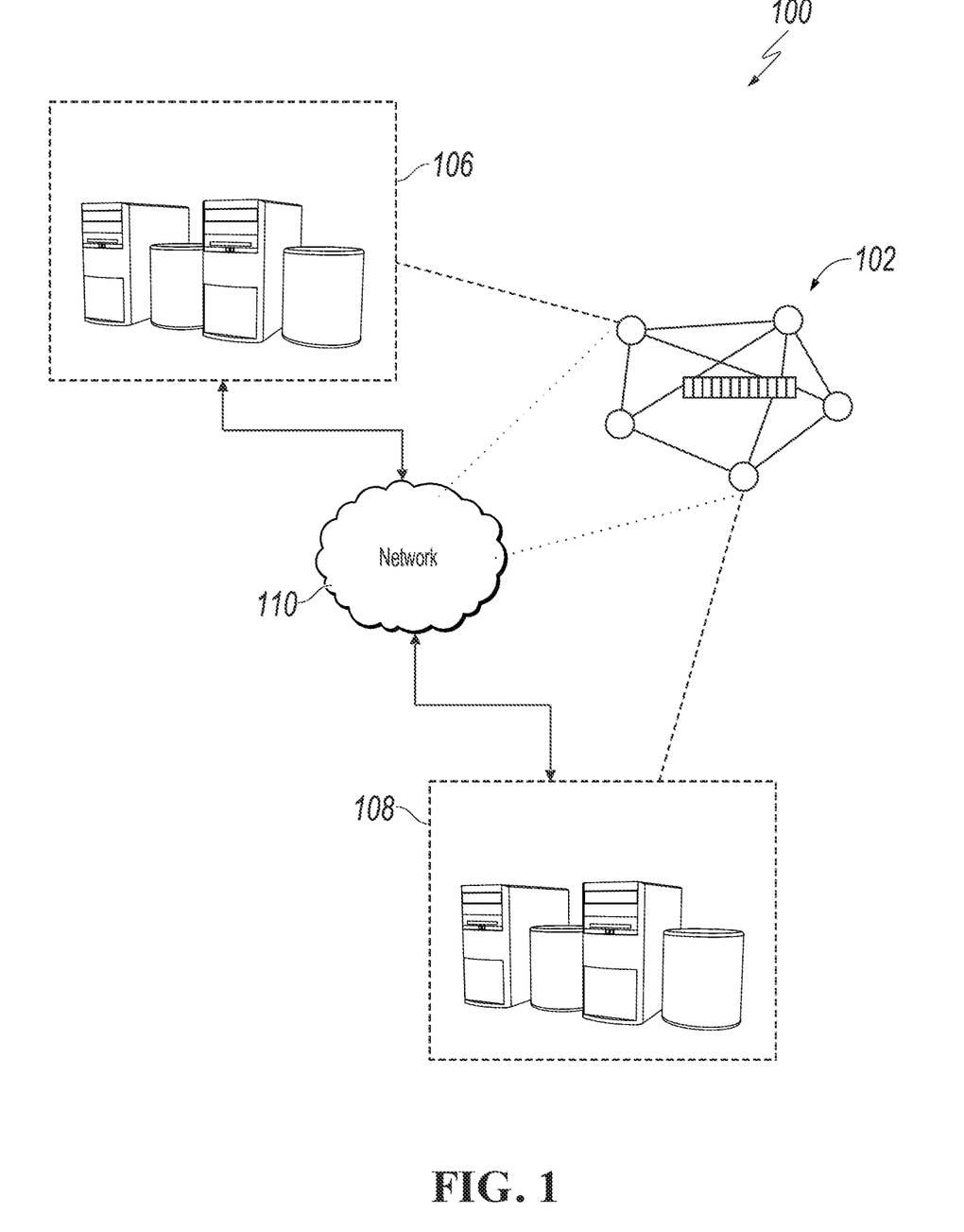
FIG. 1 depicts an example of an environment that can be used to execute embodiments of this specification.

FIG. 1 is a diagram illustrating an example of an environment 100 that can be used to execute embodiments of this specification. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
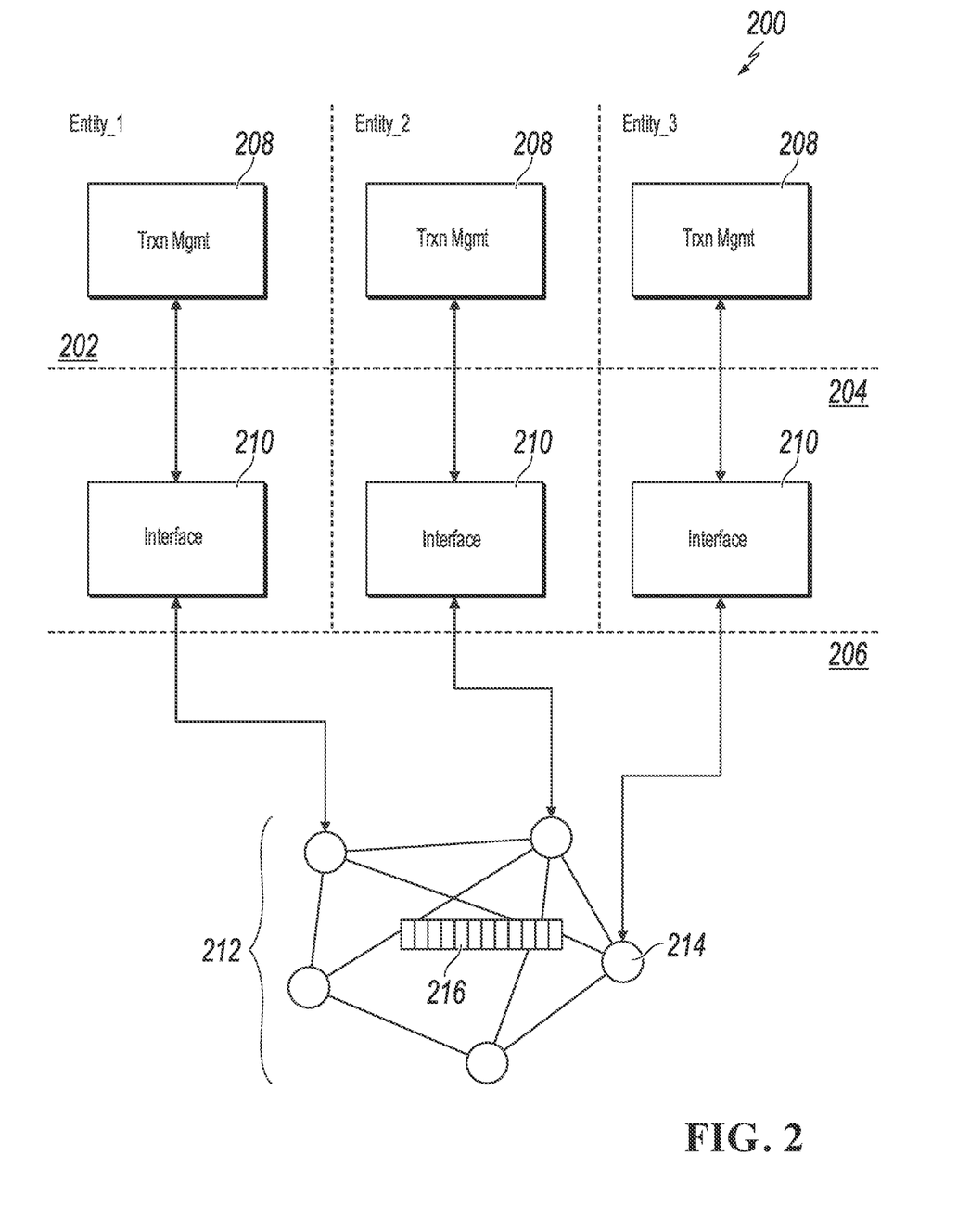
FIG. 2 depicts an example of a conceptual architecture in accordance with embodiments of this specification.

FIG. 2 depicts an example conceptual architecture 200 in accordance with embodiments of this specification. The example conceptual architecture 200 includes an entity layer 202, a hosted services layer 204, and a blockchain network layer 206. In the depicted example, the entity layer 202 includes three participants, Participant A, Participant B, and Participant C, each participant having a respective transaction management system 208.

In the depicted example, the hosted services layer 204 includes interfaces 210 for each transaction management system 208. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some embodiments, the blockchain 216 stores information associated with transactions that are performed between two or more entities participating in the consortium blockchain network.

A blockchain (e.g., the blockchain 216 of FIG. 2) is made up of a chain of blocks, each block storing data. Example data includes transaction data representative of a transaction between two or more participants. While transactions are used herein by way of non-limiting example, it is contemplated that any appropriate data can be stored in a blockchain (e.g., documents, images, videos, audio). Example transactions can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Example cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
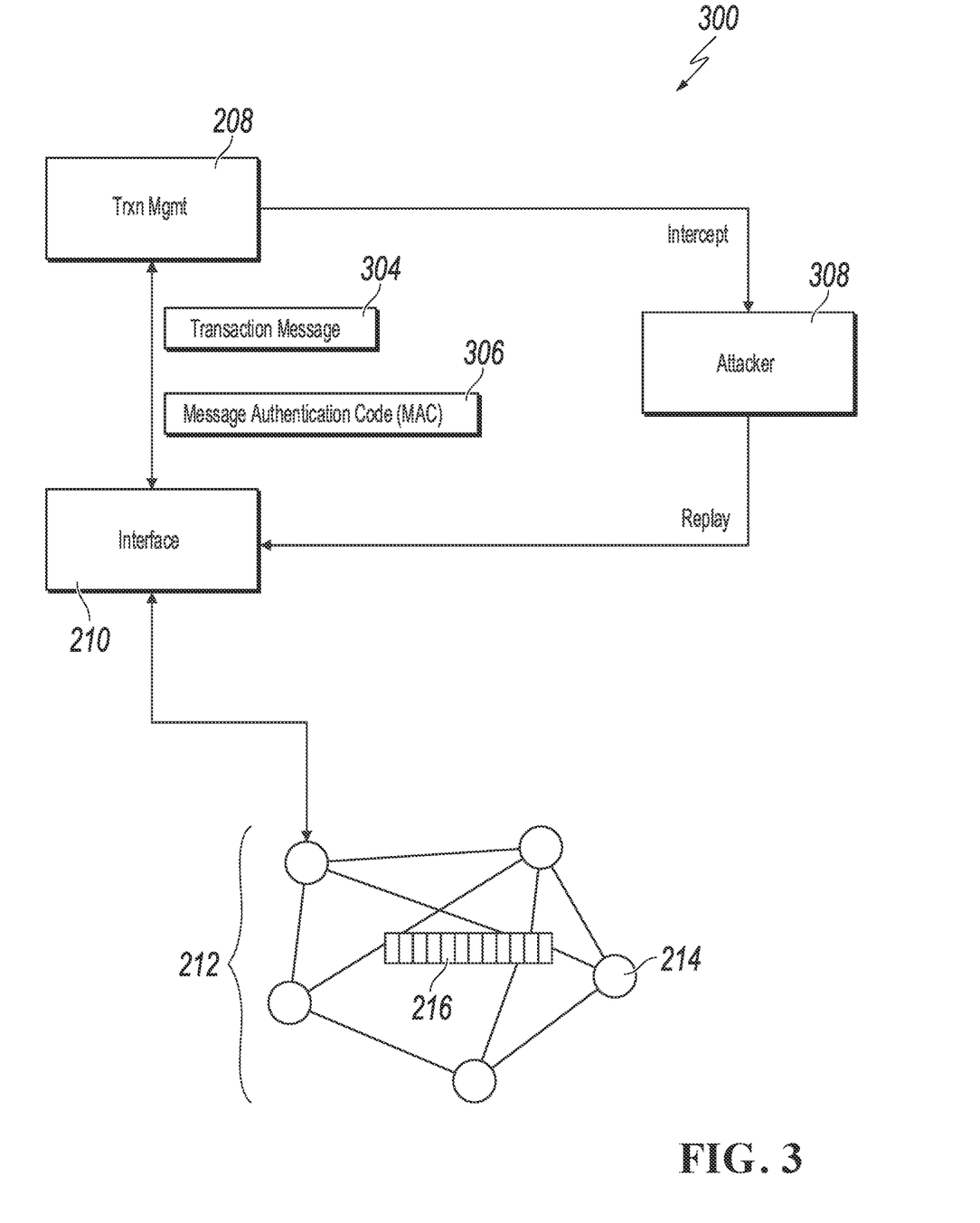
FIG. 3 depicts an example of a distributed computing system under a replay attack in accordance with embodiments of this specification.

FIG. 3 depicts an example of a distributed computing system 300 under a replay attack. The distributed computing system 300 includes a client and a server communicably coupled to each other using a computer network. The distributed computing system 300 can have an architecture similar to that described in FIG. 2, with the transaction management system 208 being the client, and the interface 210 and the node 214 together being the server. In one example, the transaction management system 208 can be a digital wallet application running on a user device. The digital wallet application can manage financial transactions of a user account and communicates with the node 214 to register new transactions on the blockchain 216. Example financial transactions include sending and receiving digital currency, executing smart contracts, opening a new user account, and so on.

In some embodiments, the communication channel between the transaction management system 208 (client) and the interface 210 (server) uses one or more authentication protocols to ensure data integrity and data security. For example, the transaction management system 208 can tag each transaction message 304 with a message authentication code (MAC) 306. The transaction message 304 specifies the content of the transaction between the transaction management system 208 and the node 214 such as the sender's blockchain address, the receiver's blockchain address, time of transaction, the amount of digital currency, and so on. The MAC 306 is uniquely generated for the transaction message 304 to authenticate the transaction and for combatting replay attacks, as will be discussed in further details below. In some examples, the transaction management system 208 can generate the MAC 306 by hashing the transaction message 304. In some examples, the MAC 306 can be generated by hashing the transaction message and a password associated with the transaction message.

In some embodiments, an attacker 308 can attempt a replay attack on the distributed computing system 300. For example, the attacker 308 can first intercept data sent from the transaction management system 208 to the interface 210, and can then attempt to authenticate with the interface 210 using the intercepted data. The attacker 308 can use the intercepted data in different ways. For example, the attacker 308 can resend the intercepted data verbatim in a new communication session with the interface 210 or the transaction management system 208. The attacker 308 can also use the intercepted data to attempt to decipher the MAC 306. In order to combat such a replay attack, the interface 210 and/or the transaction management system 208 can implement an authentication protocol for received messages using the MAC 306 discussed above.

The effectiveness of the authentication protocol can depend on the techniques used to generate the MAC 306. For example, if the MAC 306 is an exact copy of the transaction management system 208's password, the attacker 308 can replay the MAC 306 to the server and gain access to the transaction management system 208's account.

In another example, the MAC 306 is generated using a combination of the transaction management system 208's account password p and a challenge c issued by the interface 210. For example, when the transaction management system 208 initiates a communication session with the interface 210, the interface 210 will send a randomly generated challenge c to the transaction management system 208. The transaction management system 208 can concatenate the challenge c to the account password p, and use a hash function to generate a hash output h (c||p). Example hash functions include SHA-256, MD-5, and so on. The transaction management system 208 next sends the challenge c and the hash output h (c||p) to the interface 210 for authentication. As a result, although the attacker 308 sees c and h (c||p), the attacker 308 will not be able to reuse h (c||p) in a different communication session since the server (the interface 210) will issue a different challenge.

The attacker 308 can nevertheless attempt to reverse the hash output h (c||p) to obtain the password p. For example, the attacker 308 can reverse the hash output using a rainbow table. A rainbow table is a precomputed table mapping different hash outputs to hash inputs for a particular hash function. To do this, the attacker 308 can pose as a legitimate server and send a fake challenge c' to the transaction management system 208. The attacker 308 can have previously computed a rainbow table with c' for the specific hash function used. If the attacker 308 receives h (c'||p) from the unsuspecting transaction management system 208, the attacker 308 can possibly reverse the hash function to obtain the password p. As a result, although this authentication protocol is more secure than the previous one, it is still subject to security breaches if the attacker 308 can actively send out fishing challenges c'.

In another example, the MAC 306 is generated using a combination of a server-issued challenge c, a client's password p, and a nonce n. The nonce n is an arbitrary number chosen by the server and the client. Under this authentication protocol, the transaction management system 208 computes a hash output h (n||c||p) and sends this hash output along with the challenge c and the nonce n to the interface 210. This authentication protocol can prevent the attacker 308 from simply replaying the intercepted data in a new communication session, and also makes reversing hash value with a fishing c' infeasible since the nonce n is different for different transactions.

In the above example, transactions between the transaction management system 206 and the interface 210 are indexed by a monotonically increasing number. The index can be used as the nonce for security purposes. For example, the transaction management system 208 can keep track of the transaction index locally, or ping the node 214 to obtain the transaction index. However, if there exist multiple transaction management systems for a single account, the coordination of among the clients to register the current transaction number can be complex. Furthermore, transactions have to be done in series instead of being done in parallel because each transaction relies on the counter from the previous transaction. If one transaction used a wrong nonce, all the following pending transactions will be forced to restart since the number is different. In some cases, the transaction management system 208 manages multiple slots to enable parallel transactions. For example, each slot can maintain its own index numbers. However, having a large number of slots increases computing cost.

In another example, transactions are further protected from replay attacks by using a timestamp. The client has to ping the server to receive a timestamp for each transaction, and the transaction must finish within a specified time window. As a result, even if an attacker successfully intercepts information sent by a client, the attacker will not be able to use the information when the time window closes. However, obtaining the latest block timestamp can add computing cost and can deny legitimate requests when the server and the client are out of sync.

Figure 4:
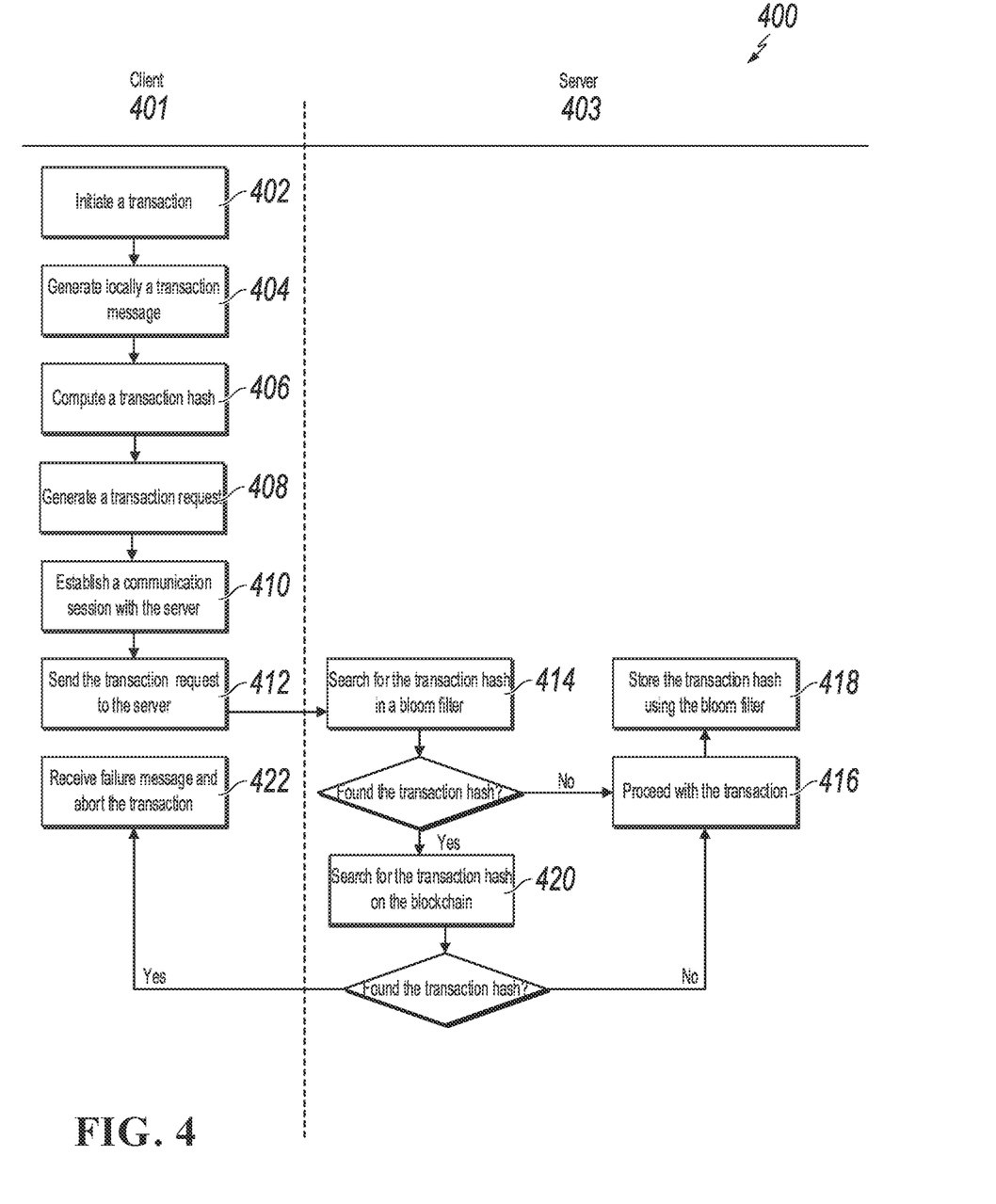
FIG. 4 depicts a swim lane diagram of an example of a process for implementing an anti-replay attack authentication protocol in accordance with embodiments of this specification.

FIG. 4 depicts a swim lane diagram of an example of a process 400 for implementing an authentication protocol that can be executed in accordance with embodiments of this specification. The authentication protocol can combat replay attacks in a network and can relieve clients from the duty of maintaining a set of nonces as described in FIG. 3. In some embodiments, the process 400 can be performed using one or more computer-executable programs executed using one or more computing devices. The authentication protocol is executed between a client 401 and a server 403. In some examples, the client 401 can be a computing device operable by a user. The server can be one or more consensus nodes of a blockchain network.

As the first step, the client 401 initiates a transaction (402) by generating locally a transaction message m (404). For example, the transaction can represent transferring a specified amount of digital currency from an account controlled by the client 401 to another account in the blockchain network. The client 401 generates the transaction message m using a data format specified by the blockchain network's protocol. For example, the transaction message m can include a sender's blockchain address, a receiver's blockchain address, an amount of digital currency to be exchanged, a mining reward, a timestamp, and so on. As such, the transaction message m is uniquely associated with the initiated transaction.

The client 401 then computes a transaction hash h(m) of the transaction message m (406). The hash function used in computing the transaction hash h(m) can be the same as the hash function used by the blockchain network for generating blocks.

The client 401 can then generate a transaction request (408) for performing and recording the transaction on the blockchain. The transaction request can include the transaction message m and the transaction hash value h(m). In some cases, the client 401 can digitally sign the transaction request with its private key. The digital signature will become invalid if the transaction request is modified.

The client 401 next establish a communication session with the server 403 (410) and send the transaction request to the server (412).

Upon receiving the transaction request, the server 403 searches for past transactions on the blockchain using the transaction hash h(m). Every transaction on the blockchain is indexed by a unique hash value, a match between the transaction hash h(m) and a transaction hash on the blockchain would indicate that the transaction information is a duplicate and may be from a replay attack. In some embodiments, each blockchain can include a number of blocks, and each block can further include a number of transactions. Since the server 403 stores a copy of the blockchain, searching a particular transaction hash by the server 403 can be computationally expensive. To implement a more efficient search strategy, the server 403 can index the existing transaction hashes and store them in a cache resource. The cache resource can have faster access speed than a regular memory or a database. In some cases, the cache resource can be dedicated to store transaction hashes.

In some cases, a transaction hash can be removed from the cache resource after the transaction is recorded on the blockchain. In such cases, the server 403 can search the cache resource and the blockchain to determine whether the transaction hash h(m) has been previously received.

In some cases, received transaction hashes can be maintained in the cache hash regardless of whether the transaction is recorded on the blockchain. In such cases, the server 403 can first search the cache resource based on efficient data structures such as a bloom filter.

A bloom filter is a probabilistic data structure used to determine whether an element is a member of a set. A query to a bloom filter may return a false positive, but never a false negative. In other words, a query returns either "possibly in set" or "definitely not in set." As a result, if a query to a bloom filter indicates that a certain transaction hash does not exist, then it is certain that the transaction hash does not exist on the blockchain. On the other hand, if a query to the bloom filter indicates that the transaction hash does exist, then further searches can be done on the entire blockchain to make sure whether the transaction hash actually exists.

Upon receiving the transaction information, the server 403 searches the transaction hash h(m) in a cache resource associated with the bloom filter (414). The cache resource can store previously received transaction hashes. If the search returns negative, indicating that the transaction hash does not exist on the blockchain, then the associated transaction is a legitimate transaction and the server 403 proceeds with the transaction (416). The transaction hash is then stored to the cache resource associated with the bloom filter (418).

If the search returns positive, then the transaction hash h(m) may or may not exist on the blockchain. To further determine the existence of h(m) on the blockchain, the server 403 performs a second search of the transaction hash h(m) (420). This time, the server 403 will search the entire blockchain associated with the server 403 for the transaction hash h(m). If the search returns negative, indicating that the transaction is legitimate, the server 403 again proceeds with the transaction (416) and broadcast the transaction on the blockchain network. If the transaction is validated, e.g., through a proof-of-work process to ensure the client 401 has a sufficient balance, the transaction will be recorded on the blockchain.

If the second search returns positive, then the transaction hash h(m) already exists in the blockchain. This indicates that the client 401 is trying to send previously used information to the server—a possible replay attack. As a result, the client 401 can receive a failure message and abort the transaction (422).

Figure 5:
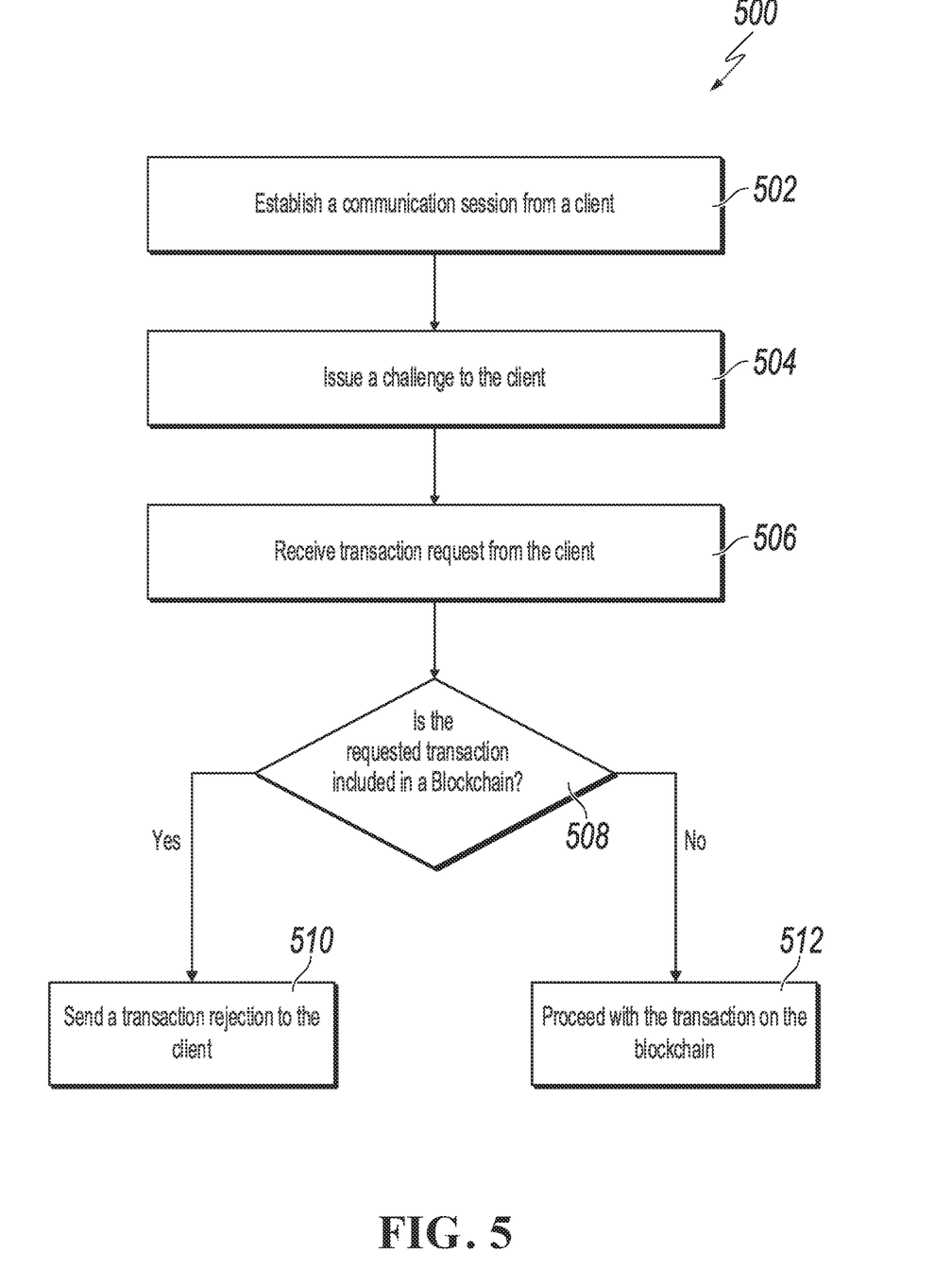
FIG. 5 depicts an example of a process that can be executed in accordance with embodiments of this specification.

FIG. 5 depicts a flow chart of an example of a process 500 for implementing an anti-replay attack authentication protocol in accordance with embodiments of this specification. The process 500 will be described from the perspective of a server, e.g., the server 403 comprising the interface 210 and the node 214 in FIG. 4. The server 403 can be a server of a blockchain network 212 as described in FIG. 2.

As the first step, the server 403 establishes a communication session from a client, e.g., the client 401 of FIG. 4 (502). The communication session allows bidirectional data exchange between the client 401 and the server 403. For example, the transaction request can include a transfer of digital asset controlled by the client 401, and the client 401 can request the server 403 to record the transaction on a blockchain, e.g., the blockchain 216. The server 403 and the client 401 share certain secret information for authentication purpose. For example, the server 403 can store a copy of the password for the client 401.

In response to establishing the communication session, the server 403 issues a challenge to the client 401 (504). The challenge is a random or pseudo-random value specifically generated for the communication session. A different communication session will use a different challenge.

In response to issuing the challenge, the server 403 receives a transaction request from the client 401 (506). For example, the transaction request can include a hash value calculated from the issued challenge, a password associated with the client, and a hash of a requested transaction for storage in a blockchain maintained by the server 403. The hash function used by the client 401 to compute the hash of the requested transaction is the same hash function used by the blockchain network 212 to hash and index transactions on the blockchain 216. The transaction request including the transaction message hash (508).

The server 403 then determines whether the requested transaction is included in the blockchain 216 (508). For example, the server 403 can query a cache resource storing the hash values of all transactions previously stored in the blockchain. To improve the query performance, the server 403 can use a bloom filter to determine whether the blockchain 216 already includes the hash of the requested transaction.

If the server 403 determines that the hash of the requested transaction is not included in the blockchain 216, the server 403 will proceed with the transaction (512). For example, the server 403 can proceed to verify the password from the client 301. If the verification is successful, the server 403 can broadcast the current transaction to the blockchain network 212 for validation.

On the other hand, if the server 403 determines that the hash of the requested transaction is already included in the blockchain 216, the server 403 will send a transaction rejection to the client 301 (510). The existence of a duplicate transaction hash can indicate that the client 301 is malicious and is replaying stolen information to gain server access.

Figure 6:
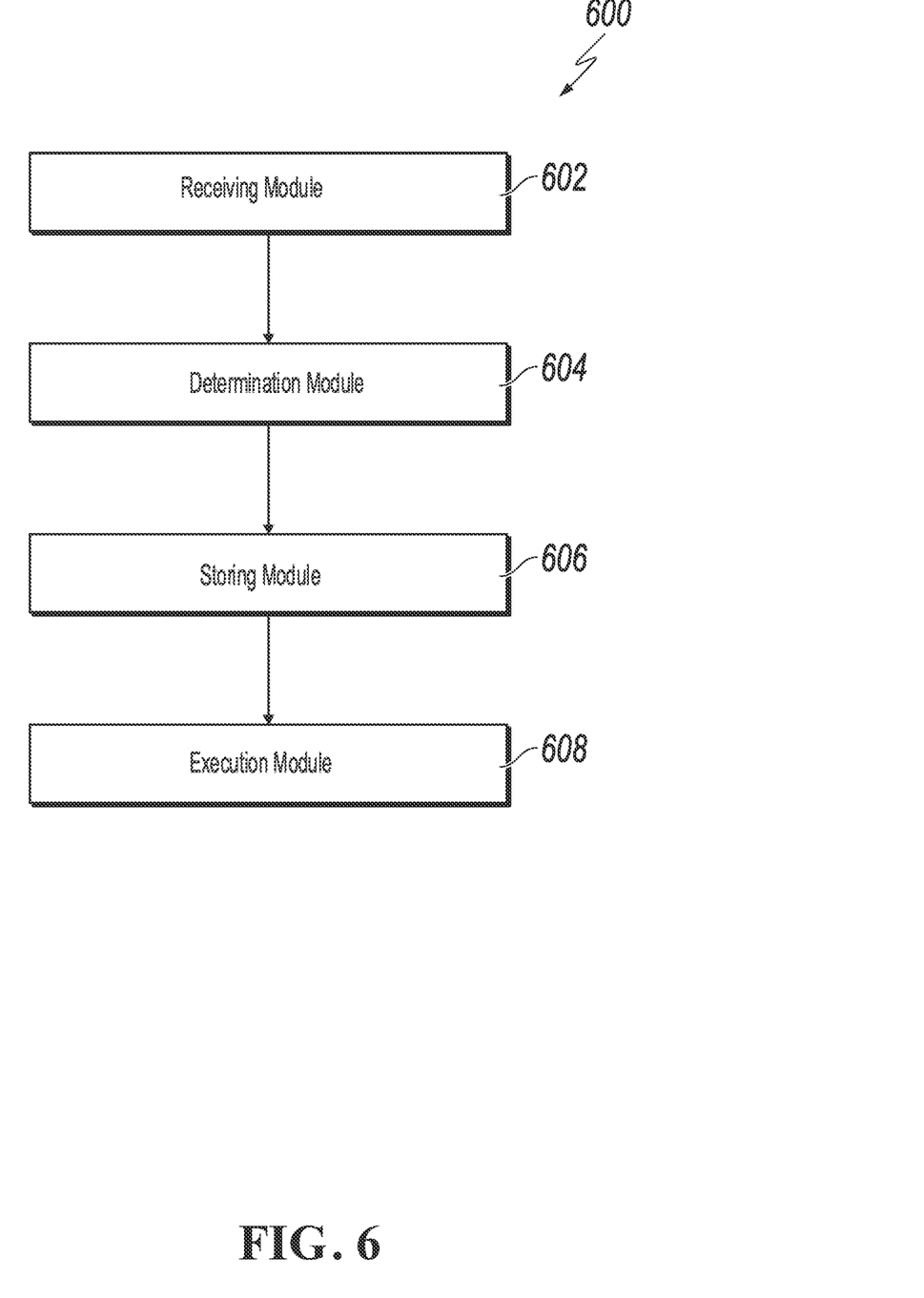
FIG. 6 depicts examples of modules of an apparatus in accordance with embodiments of this specification.

FIG. 6 is a diagram of on example of modules of an apparatus 600 in accordance with embodiments of this specification. The apparatus 600 can be an example embodiment of a blockchain node. The apparatus 600 can correspond to the embodiments described above, and the apparatus 600 includes the following: an receiving module 602 for receiving a transaction request from a client, wherein the transaction request includes a transaction requested to be recorded on a blockchain and a transaction hash calculated based on hashing the transaction; an determination module 604 for determining the transaction hash is not previously stored in a cache resource or the blockchain; a storing module 606 for storing the transaction hash in the cache resource; an execution module 608 for executing the transaction request.

The techniques described in this specification produce one or more technical effects. In some embodiments, the techniques enable a blockchain network to detect attempts to submit the same transaction request multiple times (i.e., replay attacks) before the repeated request is processed by the blockchain network and submitted to the consensus process. This enables the blockchain network avoid processing these invalid transactions, leading to greater transaction throughput. In some embodiments, the techniques eliminate the use of a nonce or other value that must be coordinated among multiple clients, thereby leading to a simpler client embodiment and less possibility for inadvertent duplicate requests.

Described embodiments of the subject matter can include one or more features, alone or in combination. For example, in a first embodiment, a method for enhancing blockchain network security comprises receiving a transaction request from a client, wherein the transaction request includes a transaction requested to be recorded on a blockchain and a transaction hash calculated based on hashing the transaction; determining the transaction hash is not previously stored in a cache resource or the blockchain; storing the transaction hash in the cache resource; and executing the transaction request.

The foregoing and other described embodiments can each, optionally, include one or more of the following features:

A first feature, combinable with any of the following features, specifies that the transaction request includes a digital signature generated based on the transaction.

A second feature, combinable with any of the previous or following features, specifies that determining the transaction hash is not previously stored in the cache resource or the blockchain includes: querying the cache resource using the transaction hash and determining that an identical copy of the transaction hash is not stored in the cache resource.

A third feature, combinable with any of the previous or following features, specifies that the cache resource is a bloom filter that stores transaction hashes received by the blockchain node prior to receiving the transaction request.

A fourth feature, combinable with any of the previous or following features, specifies that the transaction is a first transaction and the transaction hash is a first transaction hash, the blockchain further receives a second transaction request including a second transaction and a second transaction hash; determines the second transaction hash is previously stored in the cache resource and the blockchain; and sends a transaction rejection to the client.

A fifth feature, combinable with any of the previous or following features, specifies that the transaction is a first transaction and the transaction hash is a first transaction hash, and the blockchain nodes further receives a second transaction request including a second transaction and a second transaction hash; determines the second transaction hash is previously stored in the blockchain; and sends a transaction rejection to the client.

A sixth feature, combinable with any of the previous or following features, specifies that the transaction includes information associated with one or more of a blockchain address, a transaction amount, and a time of the transaction.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for enhancing blockchain network security, comprising:
   receiving, by a blockchain node, a transaction request from a client during a communication session between the blockchain node and the client, wherein the transaction request includes a transaction requested to be recorded on a blockchain and a transaction hash calculated by hashing the transaction with a pseudo-random value generated for the blockchain node and a password that is unique to the client and input by the client during the communication session;
   determining, by the blockchain node, the transaction hash is not previously stored in a cache resource or the blockchain;
   storing the transaction hash in the cache resource; and
   executing the transaction request.

2. The computer-implemented method of claim 1, wherein the transaction request includes a digital signature generated based on the transaction, wherein the digital signature comprises an asymmetric encryption of the transaction hash.

3. The computer-implemented method of claim 1, wherein determining the transaction hash is not previously stored in the cache resource or the blockchain includes:
   querying the cache resource using the transaction hash; and
   determining that an identical copy of the transaction hash is not stored in the cache resource.

4. The computer-implemented method of claim 3, wherein the cache resource implements a bloom filter that stores transaction hashes received by the blockchain node prior to receiving the transaction request.

5. The computer-implemented method of claim 4, wherein the transaction is a first transaction and the transaction hash is a first transaction hash, the method further comprising:
   receiving, by the blockchain node, a second transaction request including a second transaction and a second transaction hash;
   determining, by the blockchain node, the second transaction hash is previously stored in at least one of the cache resource and the blockchain, the previous storage of the second transaction hash in the at least one of the cache resource and the blockchain indicating a network attack in which an attacker intercepted the first transaction request; and
   sending, by the blockchain node, a transaction rejection in response to the second transaction request to the client to counter the network attack.

6. The computer-implemented method of claim 1, wherein the transaction is a first transaction and the transaction hash is a first transaction hash, and the method further comprising:
   receiving, by the blockchain node, a second transaction request including a second transaction and a second transaction hash;
   determining, by the blockchain node, the second transaction hash is previously stored in the blockchain, the previous storage of the second transaction hash in the blockchain indicating a network attack in which an attacker intercepted the first transaction request; and
   sending, by the blockchain node, a transaction rejection in response to the second transaction request to the client to counter the network attack.

7. The computer-implemented method of claim 1, wherein the transaction includes information associated with one or more of a blockchain address, a transaction amount, and a time of the transaction.

8. A non-transitory, computer-readable storage medium storing one or more instructions executable by a computer system to perform operations comprising:
   receiving, by a blockchain node, a transaction request from a client during a communication session between the blockchain node and the client, wherein the transaction request includes a transaction requested to be recorded on a blockchain and a transaction hash calculated by hashing the transaction with a pseudo-random value generated for the blockchain node and a password that is unique to the client and input by the client during the communication session;
   determining, by the blockchain node, the transaction hash is not previously stored in a cache resource or the blockchain;
   storing the transaction hash in the cache resource; and
   executing the transaction request.

9. The non-transitory, computer-readable storage medium of claim 8, wherein the transaction request includes a digital signature generated based on the transaction.

10. The non-transitory, computer-readable storage medium of claim 8, wherein determining the transaction hash is not previously stored in the cache resource or the blockchain includes:
    querying the cache resource using the transaction hash; and
    determining that an identical copy of the transaction hash is not stored in the cache resource.

11. The non-transitory, computer-readable storage medium of claim 10, wherein the cache resource is a bloom filter that stores transaction hashes received by the blockchain node prior to receiving the transaction request.

12. The non-transitory, computer-readable storage medium of claim 11, wherein the transaction is a first transaction and the transaction hash is a first transaction hash, the operations further comprising:
    receiving, by the blockchain node, a second transaction request including a second transaction and a second transaction hash;
    determining, by the blockchain node, the second transaction hash is previously stored in the cache resource and the blockchain; and
    sending, by the blockchain node, a transaction rejection to the client.

13. The non-transitory, computer-readable storage medium of claim 8, wherein the transaction is a first transaction and the transaction hash is a first transaction hash, and the operations further comprising:
    receiving, by the blockchain node, a second transaction request including a second transaction and a second transaction hash;

determining, by the blockchain node, the second transaction hash is previously stored in the blockchain; and sending, by the blockchain node, a transaction rejection to the client.

14. The non-transitory, computer-readable storage medium of claim 8, wherein the transaction includes information associated with one or more of a blockchain address, a transaction amount, and a time of the transaction.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, by a blockchain node, a transaction request from a client during a communication session between the blockchain node and the client, wherein the transaction request includes a transaction requested to be recorded on a blockchain and a transaction hash calculated by hashing the transaction with a pseudo-random value generated for the blockchain node and a password that is unique to the client and input by the client during the communication session;
      determining, by the blockchain node, the transaction hash is not previously stored in a cache resource or the blockchain;
      storing the transaction hash in the cache resource; and
      executing the transaction request.

16. The system of claim 15, wherein the transaction request includes a digital signature generated based on the transaction.

17. The system of claim 15, wherein determining the transaction hash is not previously stored in the cache resource or the blockchain includes:
   querying the cache resource using the transaction hash; and
   determining that an identical copy of the transaction hash is not stored in the cache resource.

18. The system of claim 17, wherein the cache resource is a bloom filter that stores transaction hashes received by the blockchain node prior to receiving the transaction request.

19. The system of claim 18, wherein the transaction is a first transaction and the transaction hash is a first transaction hash, the operations further comprising:
   receiving, by the blockchain node, a second transaction request including a second transaction and a second transaction hash;
   determining, by the blockchain node, the second transaction hash is previously stored in the cache resource and the blockchain; and
   sending, by the blockchain node, a transaction rejection to the client.

20. The system of claim 15, wherein the transaction is a first transaction and the transaction hash is a first transaction hash, and the operations further comprising:
   receiving, by the blockchain node, a second transaction request including a second transaction and a second transaction hash;
   determining, by the blockchain node, the second transaction hash is previously stored in the blockchain; and
   sending, by the blockchain node, a transaction rejection to the client.

21. The system of claim 15, wherein the transaction includes information associated with one or more of a blockchain address, a transaction amount, and a time of the transaction.

* * * * *